(12) United States Patent
Gaskins et al.

(10) Patent No.: US 6,681,311 B2
(45) Date of Patent: Jan. 20, 2004

(54) TRANSLATION LOOKASIDE BUFFER THAT CACHES MEMORY TYPE INFORMATION

(75) Inventors: Darius D. Gaskins, Austin, TX (US); G. Glenn Henry, Austin, TX (US); Rodney E. Hooker, Austin, TX (US)

(73) Assignee: IP-First, LLC, Fremont, CA (US)

( * ) Notice: Subject to any disclaimer, the term of this patent is extended or adjusted under 35 U.S.C. 154(b) by 271 days.

(21) Appl. No.: 09/908,909

(22) Filed: Jul. 18, 2001

(65) Prior Publication Data

US 2003/0018877 A1 Jan. 23, 2003

(51) Int. Cl.$^7$ .............................................. G06F 12/00
(52) U.S. Cl. ..................... 711/203; 711/142; 711/143; 711/209; 711/213
(58) Field of Search .............................. 711/142, 143, 711/203, 209, 213

(56) References Cited

U.S. PATENT DOCUMENTS

| | | | |
|---|---|---|---|
| 5,561,814 A | * | 10/1996 | Glew et al. ................... 710/13 |
| 5,751,996 A | * | 5/1998 | Glew et al. .................. 711/145 |
| 5,778,407 A | * | 7/1998 | Glew et al. ..................... 711/2 |
| 5,946,713 A | * | 8/1999 | Hacking et al. ............. 711/170 |

OTHER PUBLICATIONS

NB9402387, IBM Technical Disclosure Bulletin, 'Conditional Least–Recently–Used Data Cache Design to Support Multimedia Applications', Feb. 1, 1994.*

NN9312517, IBM Technical Disclosure Bulletin, 'Demand Data Cache Prefetching to Improve the Performance of Multimedia Applications', Dec. 1, 1993.*

Intel Data Book, 'Microprocessors vol. III', pp. 1–1 to 1–6, Nov. 1993.*

Intel Architecture Software Developer's Manual, vol. 3: System Programming, 1999, pp. 3–23 to 3–28 and 9–5 to 9–7.

* cited by examiner

*Primary Examiner*—Reba I. Elmore
(74) *Attorney, Agent, or Firm*—E. Alan Davis; James W. Huffman (57) ABSTRACT

A translation lookaside buffer (TLB) that caches memory types of memory address ranges. A data unit includes a TLB which, in addition to caching page table entries including translated page base addresses of virtual page numbers as in a conventional TLB, also caches memory address range memory types provided by a memory type unit (MTU). In the case of a hit of a virtual address in the TLB, the TLB provides the memory type along with the page table entry, thereby avoiding the need for a serialized accessed to the MTU using the physical address output by the TLB. Logic which controls a processor bus access necessitated by the virtual address makes use of the memory type output by the TLB sooner than would be available from the MTU in conventional data units. If the MTU is updated, the TLB is flushed to insure consistency of memory type values.

35 Claims, 8 Drawing Sheets

Data Unit with TLB that Caches Memory Types

FIG. 1 (Related Art)    Conventional Data Unit

FIG. 2 (Related Art)

*Page Table Entry (PTE)*

FIG. 3 (Related Art)

*Memory Type Unit (MTU)*

FIG. 4 (Related Art)

*Memory Type (MT)*

FIG. 5 (Related Art)

Conventional Translation Lookaside Buffer (TLB)

FIG. 6 (Related Art)

Conventional Data Unit Operation

FIG. 7

*Data Unit with TLB that Caches Memory Types*

FIG. 8

Memory Type-Caching TLB

FIG. 9

Cached Memory Type Data Unit Operation

FIG. 10

Cached Memory Region Type Operation

TRANSLATION LOOKASIDE BUFFER THAT CACHES MEMORY TYPE INFORMATION

FIELD OF THE INVENTION

This invention relates in general to the field of microprocessor bus transaction ordering, and more particularly to caching of memory region type information for specifying such ordering.

BACKGROUND OF THE INVENTION

Many modern microprocessors support the notion of virtual memory. In a virtual memory system, instructions of a program executing on the microprocessor refer to data using virtual addresses in a virtual address space of the microprocessor. The virtual address space is typically much larger than the actual physical memory space of the system, and in particular, the amount of virtual memory is typically much greater than the amount of physical memory present in the system. The virtual addresses generated by the program instructions are translated into physical addresses that are provided on a processor bus coupled to the microprocessor in order to access system memory or other devices, such as I/O devices.

A common virtual memory scheme supported by microprocessors is a paged memory system. A paged memory system employs a paging mechanism for translating, or mapping, virtual addresses to physical addresses. The physical address space of the processor bus is divided up into physical pages of fixed size. A common page size is 4 KB. The virtual addresses comprise a virtual page number portion and a page offset portion. The virtual page number specifies a virtual page in the virtual address space. The virtual page number is translated by the paging mechanism into a physical page address, i.e., a physical address on the processor bus of the page. The physical page address is commonly referred to as a page base address. The page offset specifies a physical offset in the physical page, i.e., a physical offset from the page base address.

The advantages of memory paging are well known. One example of a benefit of memory paging systems is that they enable programs to execute with a larger virtual memory space than physically exists. Another benefit is that memory paging facilitates relocation of programs in different physical memory locations during different or multiple executions of the program. Another benefit of memory paging is that it allows multiple processes to execute on the processor simultaneously, each having its own allocated physical memory pages to access without having to be swapped in from disk, and without having to dedicate the full physical memory to one process. Another benefit is that memory paging facilitates memory protection from other processes on a page basis.

Page translation, i.e., translation of the virtual page number to the page base address, is accomplished by what is commonly referred to as a page table walk. Typically, the operating system maintains page tables that contain information for translating the virtual page number to a page base address. Typically, the page tables reside in system memory. Hence, it is a relatively costly operation to perform a page table walk, since multiple memory accesses must typically be performed to do the translation.

To improve performance by reducing the number of page table walks, many microprocessors provide a mechanism for caching page table information, which includes page base addresses translated from frequently used virtual page numbers. The caching mechanism is commonly referred to as a translation lookaside buffer (TLB) The virtual page number is provided to the TLB, and the TLB performs a lookup of the virtual page number. If the virtual page number hits in the TLB, then the TLB provides the corresponding translated page base address, thereby avoiding the need to perform a page table walk to translate the virtual page number to the page base address. The page base address is concatenated with the page offset to generate a physical address supplied on the processor bus as part of a bus request to transfer data to or from the microprocessor.

In a typical microprocessor system, devices of different types are coupled to the microprocessor bus, or some bus lower in the bus hierarchy of the system. Examples of the devices are system memory (commonly DRAM), ROM, and memory-mapped I/O devices, such as video controller frame buffers, or storage device control and status registers. The devices are addressed by physical addresses provided on the processor bus that are translated from virtual addresses as described above.

The various types of memory or devices accessed by the microprocessor have different attributes that affect the manner in which accesses to the memory or devices may be performed. For example, consider the case of a memory-mapped I/O device. Assume a store to a memory-mapped control register in a disk controller is followed by a load from a memory-mapped status register in the disk controller. In this situation, the processor bus request associated with the load must not be issued until the bus request associated with the store has completed, or else proper program operation may not occur. In contrast, it is typically desirable to allow accesses to different locations in system memory DRAM to be performed out-of-order and to be write-back cacheable. As a third example, it is typically desirable for reads from video frame buffers to not be cached to improve cache performance, and for writes to be delayed to allow for combining of multiple writes to the frame buffers to enhance write throughput.

Typically, a microprocessor provides a means for the operating system to specify a memory type associated with specified ranges of the processor bus space. That is, the microprocessor provides a mechanism for mapping a physical address range of the processor bus to a memory type, or device type, of memory or devices occupying the address range. The memory type specifies cache attributes associated with the address range, such as whether the address range is cacheable or uncacheable, write-back or write-through, writeable or write-protected, and whether write-combining is allowed. The characteristics specified by the memory type may also control whether the specified address range supports out-of-order execution or speculative accesses.

The circuit in the microprocessor for mapping a physical address on the processor bus to a memory type is commonly referred to as a memory type unit (MTU). The MTU receives a physical address and provides the memory type associated with the memory range in which the physical address lies. The MTU must operate on physical addresses independent of the virtual to physical address mapping used to generate the physical address. Because the MTU must operate on a physical address, when paging is enabled, the TLB lookup to produce the physical address and the MTU lookup are serialized. That is, the total time required to obtain the memory type in order to determine whether a load or store may proceed to the processor bus is at best the sum of the TLB lookup time plus the MTU lookup time.

However, it may be known sooner than the sum of the TLB and MTU lookup times that the load or store needs to generate a processor bus access. For example, assume the processor data cache indicates that a load address misses in the data cache, thus requiring a read from system memory on the processor bus. The data cache may generate the miss well before the memory type is available, due to the serialized lookup times of the TLB and MTU. This is detrimental to performance, particularly since accesses to system memory or other devices accessed through the processor bus may be relatively lengthy, and hence, should be initiated as soon as possible. Therefore, what is needed is a way to reduce the time required to determine the memory type.

SUMMARY

The present invention provides an apparatus and method for caching memory types in the TLB of the processor in order to reduce the time required to obtain the memory type. Accordingly, in attainment of the aforementioned object, it is a feature of the present invention to provide a translation lookaside buffer (TLB) for caching memory types. The TLB includes an input that receives a virtual address. The TLB also includes a tag array, coupled to the input, which caches virtual addresses. The TLB also includes a data array, coupled to the input, which caches physical addresses translated from corresponding ones of the virtual addresses cached in the tag array, and which caches a memory type associated with each of the physical addresses. The TLB also includes an output, coupled to the data array, which provides the memory type associated with one of the physical addresses from the data array selected by the virtual address received on the input.

In another aspect, it is a feature of the present invention to provide a data unit in a microprocessor having a processor bus. The data unit includes a memory type unit (MTU) that stores physical memory ranges and memory types associated with the physical memory ranges. The data unit also includes a translation lookaside buffer (TLB), coupled to the MTU, which caches page table entries, and which caches memory types from the MTU associated with physical addresses in the page table entries.

In another aspect, it is a feature of the present invention to provide a microprocessor. The microprocessor includes a bus interface unit (BIU), coupled to a bus external to the microprocessor, which issues requests on the bus. The microprocessor also includes a memory type unit (MTU), coupled to the BIU, which stores memory types associated with address ranges of the bus. The memory types specify caching characteristics of the requests on the bus in each of the address ranges. The microprocessor also includes a translation lookaside buffer (TLB), coupled to the BIU, which caches virtual memory addresses, and which caches corresponding addresses of the bus translated from the virtual memory addresses, and which caches one of the memory types stored in the MTU for each of the addresses of the bus.

In another aspect, it is a feature of the present invention to provide a method of providing a memory type for a physical address range in a microprocessor. The method includes detecting a miss of a virtual address in a translation lookaside buffer (TLB), translating the virtual address into a physical address in response to the miss, providing a memory type of the physical address in response to the physical address, and caching the memory type in the TLB in association with the virtual address.

In another aspect, it is a feature of the present invention to provide a method of providing a memory type for a physical address range in a microprocessor. The method includes caching a plurality of physical addresses translated from a plurality of virtual address in a translation lookaside buffer (TLB) based on virtual addresses, and caching in the TLB a plurality of memory types associated with the plurality of physical addresses. The method also includes applying a virtual address to the TLB, and providing one of the plurality of memory types cached in the TLB associated with one of the plurality of physical addresses based on the virtual address applied to the TLB.

An advantage of the present invention is that it eliminates the need, in the typical case of a TLB hit, for the memory type unit (MTU) to perform its lookup of the physical address to obtain a memory type (MT) for the address. Consequently, the time required to determine whether a condition exists that requires blocking access on the processor bus to the physical address is reduced in the typical case. Consequently, the processor may potentially access the processor bus sooner than in the prior method. Another advantage of the present invention is that it alleviates the need to add another pipeline stage to accommodate the MTU lookup of the memory type of the prior method. The addition of another pipeline stage is detrimental to processor performance in the event of a mispredicted branch, since another stage of branch penalty would be introduced. Finally, the present invention alleviates the need to increase the clock cycle time of the processor to accommodate the MTU lookup of the memory type of the prior method.

Other features and advantages of the present invention will become apparent upon study of the remaining portions of the specification and drawings.

DETAILED DESCRIPTION

The present invention will be better understood by first describing a related art data unit in a microprocessor that does not have the benefit of the features of the present invention.

Figure 1:
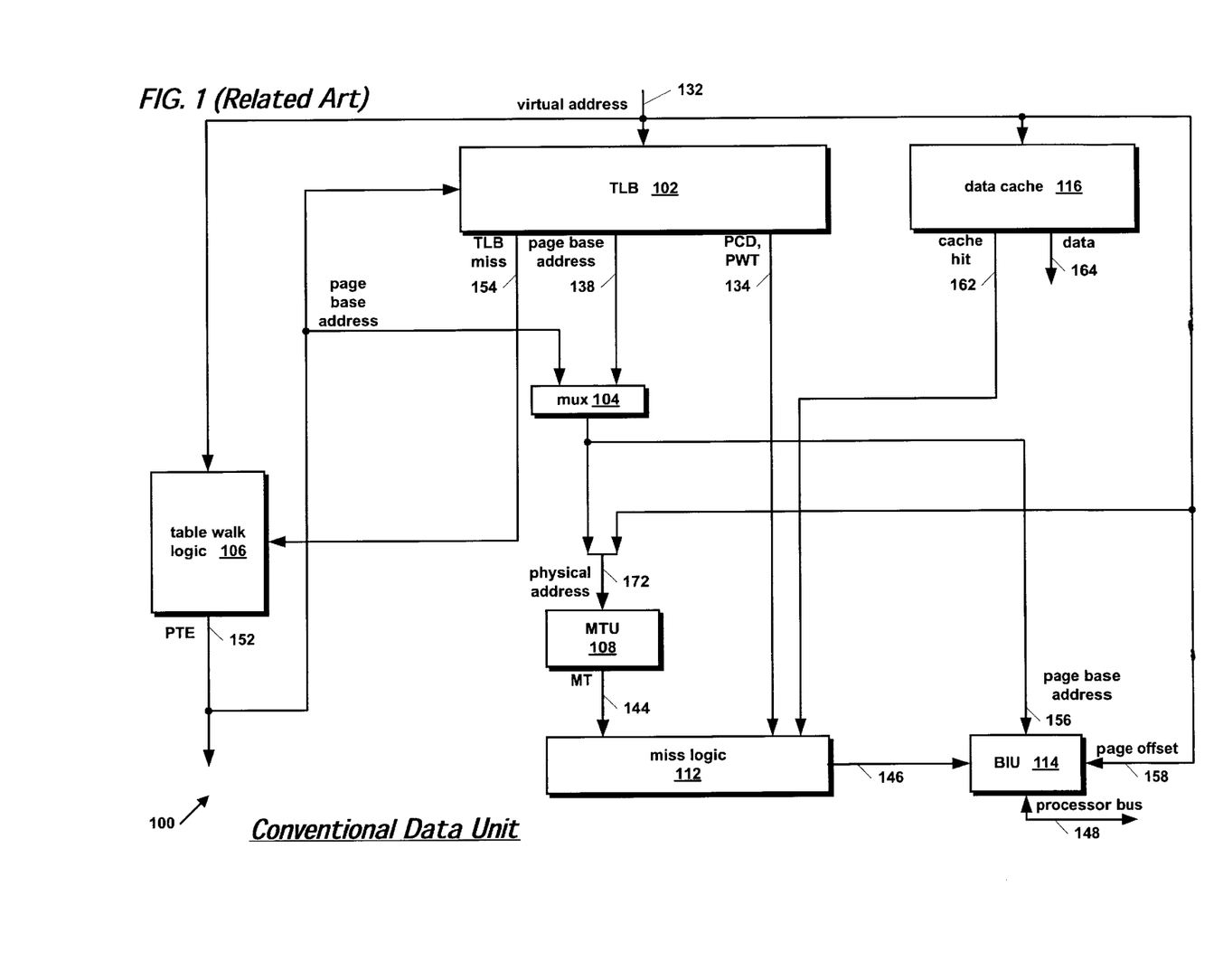
FIG. 1 is a block diagram of a related art data unit in a microprocessor.

Referring now to FIG. 1, a block diagram of a related art data unit 100 in a microprocessor is shown. The data unit 100 comprises a bus interface unit (BIU) 114. The BIU 114 is coupled to a processor bus 148. The processor bus 148 interfaces the microprocessor to other devices within a computer system, such as with memory controllers for interfacing the microprocessor to system memory, with bus bridge controllers for interfacing the microprocessor to I/O devices, and with other microprocessors. The BIU 114 issues requests on the processor bus 148 to write data to or read data from the other devices. The BIU 114 interfaces other portions of the data unit 100 with the processor bus 148.

In particular, the BIU 114 issues requests on the processor bus 148 using an address of the processor bus 148. The processor bus 148 addresses are physical addresses corresponding to physical locations in system memory or other devices, such as I/O devices. The physical addresses comprise a page base address 156 and a page offset 158 provided to the BIU 114. In one embodiment, if the physical page size is 4 KB, then the page base address 156 comprises 20 bits and the page offset 158 comprises 12 bits, and if the physical page size is 4 MB, then the page base address 156 is 10 bits and the page offset 158 is 22 bits.

The data unit 100 also comprises a data cache 116. The data cache 116 receives a virtual address 132 of data to be loaded into or stored by the microprocessor. The data cache 116 generates a cache hit signal 162 to indicate whether the virtual address 132 hit in the data cache 116. The data cache 116 provides a cache line containing the requested data on a data bus 164 if the virtual address 132 hit in the data cache 116.

The data unit 100 also comprises a translation lookaside buffer (TLB) 102. The TLB 102 caches page table entries. In one embodiment, the TLB 102 caches page table entries described in FIG. 2.

Figure 2:
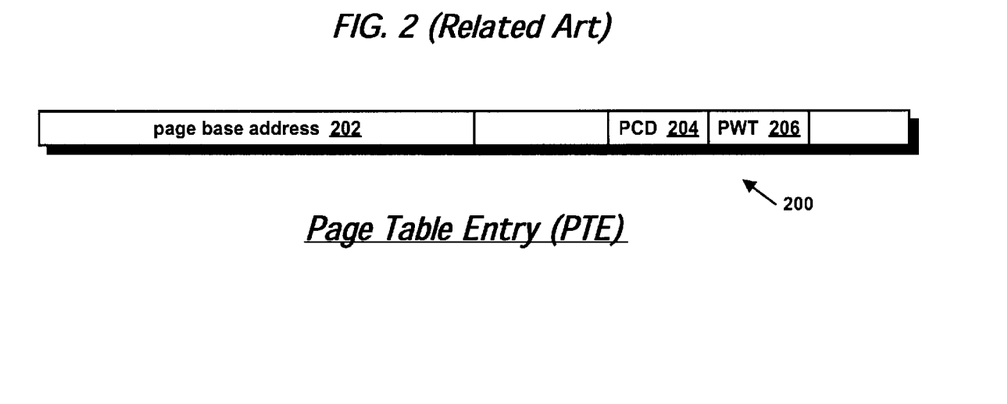
FIG. 2 is a block diagram of a related art page table entry (PTE).

Referring now to FIG. 2, a block diagram of a related art page table entry (PTE) 200 is shown. The PTE 200 of the embodiment shown in FIG. 2 is a PTE 200 used in IA-32 Architecture® processors, as described on pages 3-23 through 3-28 of the Intel Architecture Software Developer's Manual, Volume 3: System Programming, 1999, which is hereby incorporated by reference.

The PTE 200 comprises a page base address 202. The page base address 202 specifies the physical page address of a memory page in the processor bus 148 address space of FIG. 1 associated with a virtual page number comprised in the virtual address 132 of FIG. 1. That is, the page base address 202 specifies the physical address of the first byte of a page. In one embodiment, the page base address 202 comprises 20 bits, and is the 20 most-significant bits of the physical address of the page.

The PTE 200 also comprises a page-level cache disable (PCD) bit 204. The PCD bit 204 specifies whether or not the associated page may be cached. The PTE 200 also comprises a page-level write-through (PWT) bit 206. The PWT bit 206 specifies whether the associated page has a write-through or write-back cache policy.

Referring again to FIG. 1, the TLB 102 receives the virtual address 132. Typically, the virtual address 132 is associated with an instruction flowing down the microprocessor pipeline, such as a load or store instruction. Additionally, the virtual address 132 may be associated with other operations, such as a speculative prefetch, a table-walk memory access, or write-back to system memory of an evicted cache line, for examples.

The TLB 102 performs a lookup of the virtual page number of the virtual address 132 and indicates on a TLB miss signal 154 whether or not the virtual page number hits in the TLB 102. The TLB 102 provides the page base address 138 (as described above with respect to FIG. 2 as page base address 202) associated with the virtual page number if the virtual page number hits in the TLB 102. In addition, the TLB 102 provides the associated PCD and PWT bits 134 (as described above with respect to FIG. 2 as PCD 204 and PWT 206 bits, respectively).

The data unit 100 also comprises table walk logic 106. The table walk logic 106 receives the virtual address 132. Additionally, the table walk logic 106 receives the TLB miss signal 154. If the TLB miss signal 154 indicates a miss of the TLB 102, the table walk logic 106 performs a page table walk to obtain the PTE associated with the virtual address 132. The table walk logic 106 outputs the PTE 152, which is provided to the TLB 102 for caching.

The data unit 100 also comprises a mux 104. The mux 104 receives the page base address 138 from the TLB 102. The mux 104 also receives the page base address portion of the PTE 152 generated by the table walk logic 106. In the case of a TLB 102 hit, the mux 104 selects the page base address 138 from the TLB 102. Otherwise, the mux 104 selects the page base address portion of the PTE 152 from the table walk logic 106.

The data unit 100 also comprises a memory type unit (MTU) 108. The MTU 108 receives a physical address 172 that is the concatenation of the output of mux 104 and the page offset 158. The MTU 108 outputs a memory type (MT) 144 associated with a physical address range of the processor bus 148 in which the physical address 172 lies. The MTU 108 is described in more detail with respect to FIG. 3.

Figure 3:
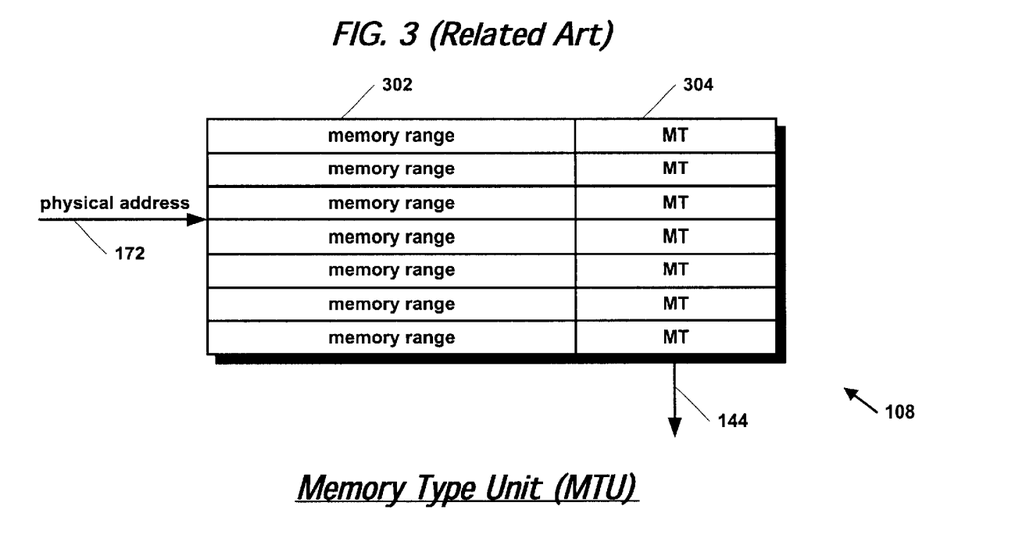
FIG. 3 is a block diagram of the MTU of FIG. 1.

Referring now to FIG. 3, a block diagram of the MTU 108 of FIG. 1 is shown. The MTU 108 comprises an array of storage elements indexed by the physical address 172 of FIG. 1. Each storage element includes a memory range field 302 and a memory type (MT) field 304 associated with the memory range field 302 that describes the memory type of the associated memory range field 302. In one embodiment, memory ranges may be specified in the memory range field 302 to a 4 KB granularity. The MTU 108 outputs the MT 144 from the MT field 304 selected by the physical address 172. The MT 304 is described in more detail with respect to FIG. 4.

Figure 4:
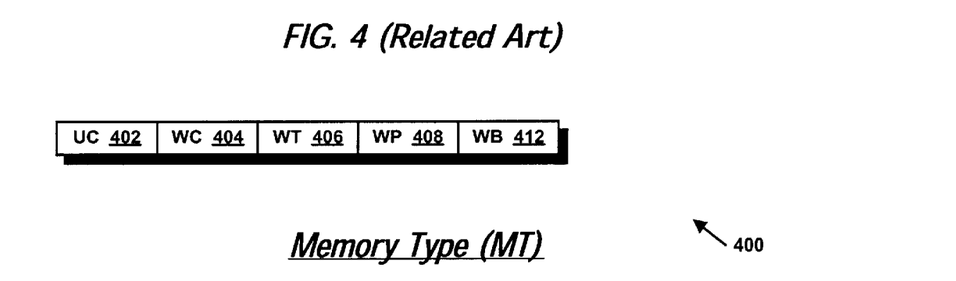
FIG. 4 is a block diagram of a related art memory type (MT).

Referring now to FIG. 4, a block diagram of a related art memory type (MT) 400 is shown. The MT 400 of the embodiment shown in FIG. 4 is a memory type, or caching type, used in IA-32 Architecture® processors, as described on pages 9-5 through 9-7 of the Intel Architecture Software Developer's Manual, Volume 3: System Programming, 1999, which is hereby incorporated by reference. The MT 400 comprises five mutually exclusive bits for specifying one of five memory types associated with a memory region or range, such as the memory ranges 302 of FIG. 3.

The MT 400 comprises a UC (uncacheable) bit 402 for specifying an uncacheable memory type. Accesses to a memory range with an uncacheable memory type are not cached. No speculative memory accesses or page table walk accesses are performed in the memory range. All accesses to the memory range appear on the processor bus 148 of FIG. 1. Finally, all accesses to the memory range appear on the processor bus 148 in the order in which they appear in the program. Operating systems commonly assign a memory type of uncacheable to memory ranges occupied by memory-mapped I/O devices.

The MT 400 also comprises a WC (write-combining) bit 404 for specifying a write-combining memory type. Accesses to a memory range with a write-combining memory type are not cached. Furthermore, the processor bus 148 protocol does not enforce coherency to write-combining memory type memory ranges. In order to improve write throughput, the microprocessor may combine stores to a write-combining memory type memory range. Operating systems commonly assign a memory type of write-combining to memory ranges occupied by video frame buffers.

The MT 400 also comprises a WT (write-through) bit 406 for specifying a write-through memory type. Accesses to a memory range with a write-through memory type are cached. If a load from a write-through memory range hits in the data cache 116 of FIG. 1, the load is fulfilled by the data cache 116. If the load misses in the data cache 116 of FIG. 1, the load causes a fill of the specified line of the data cache 116. Stores to a write-through range are written to the data cache 116 and to system memory. If the store to memory hits an invalid line in the data cache 116, the invalid line is not filled. If the store to memory hits a valid line in the data cache 116, the valid line is either filled or invalidated. The microprocessor may combine stores to a write-through memory range. Operating systems commonly assign a memory type of write-through to memory ranges occupied by devices that access system memory, but do not perform snooping of memory accesses.

The MT 400 also comprises a WP (write-protect) bit 408 for specifying a write-protect memory type. If a load from a memory range with a write-protect memory type hits in the data cache 116 the load is satisfied by the data cache 116. If the load misses, a fill of the specified cache line in the data cache 116 is performed. A store to a write-protect memory range always appears on the processor bus 148. The corresponding write on the processor bus 148 instructs other microprocessors on the processor bus 148 to invalidate corresponding cache lines. The microprocessor may combine stores to a write-protect memory range.

The MT 400 also comprises a WB (write-back) bit 412 for specifying a write-back memory type. Accesses to a memory range with a write-back memory type are cached. If a load from a write-back memory range hits in the data cache 116, the load is fulfilled by the data cache 116. If the load misses in the data cache 116 of FIG. 1, the load causes a fill of the specified line of the data cache 116. Stores to a write-back range are written to the data cache 116 but not to system memory until necessary. If the store misses in the data cache 116, the line is filled. The microprocessor may combine stores to a write-back memory range. The microprocessor may perform speculative loads from a write-back memory range. Operating systems commonly assign a memory type of write-back to memory ranges occupied by system DRAM.

Referring again to FIG. 1, the data unit 100 also comprises miss logic 112. The miss logic 112 receives the MT 144 from the MTU 108. The miss logic 112 also receives the PCD and PWT bits 134 from the TLB 102. Furthermore, the miss logic 112 receives the cache hit signal 162 from the data cache 116. In response to the signals received, the miss logic 112 generates a control signal 146 to control the BIU 114.

Figure 5:
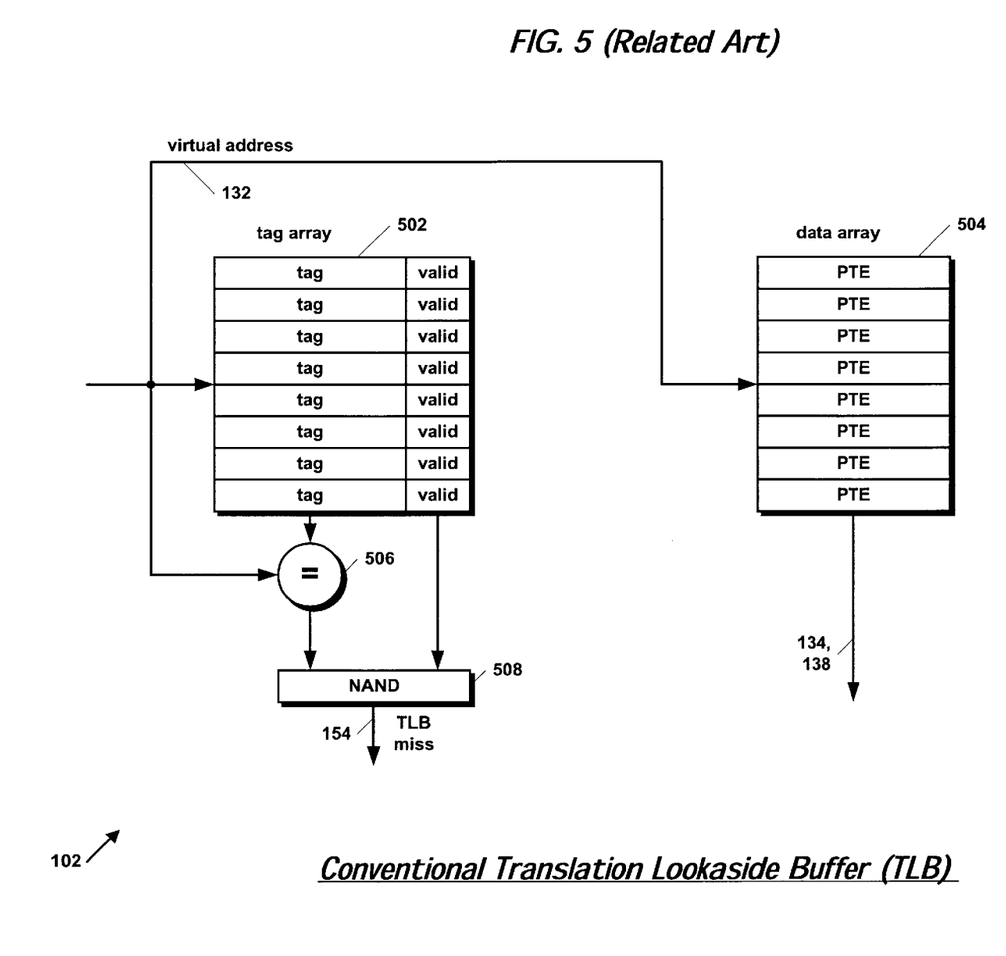
FIG. 5 is a block diagram of the TLB of FIG. 1.

Referring now to FIG. 5, a block diagram of the TLB 102 of FIG. 1 is shown. The TLB 102 comprises a tag array 502 and a data array 504. The tag array 502 and the data array 504 each receive the virtual address 132 of FIG. 1. In particular, the tag array 502 and data array 504 receive the virtual page number of the virtual address 132. In one embodiment, the TLB 102 comprises a four-way set-associative cache.

The data array 504 comprises an array of storage elements for storing page table entries like the PTE 200 of FIG. 2. The lower bits of the virtual page number of the virtual address 132 index the data array 504 to select one of the storage elements in the data array 504. The PTE of the selected storage element is output by the data array 504 as the page base address 138 of FIG. 1 and the PCD and PWT bits 134 of FIG. 1.

The tag array 502 comprises an array of storage elements for storing address tags of the PTEs in the data array 504. The lower bits of the virtual page number of the virtual address 132 index the tag array 502 to select one of the storage elements in the tag array 502. The tag comprises the virtual page number of the virtual address 132 of a memory page whose PTE is stored in a corresponding storage element of the data array 504. Each tag in the tag array 502 has an associated valid bit for indicating whether the tag in the storage element is valid. The valid bit of the selected storage element is output by the tag array 502 and provided as an input to a two-input NAND gate 508.

The tag of the selected storage element is output by the tag array 502 to a comparator 506 (or set of comparators in the set-associative TLB embodiment) that compares the selected tag and the virtual page number of the virtual address 132. The output of the comparator 506 is provided to the NAND gate 508. The output of the NAND gate 508 generates the TLB miss signal 154 of FIG. 1.

Figure 6:
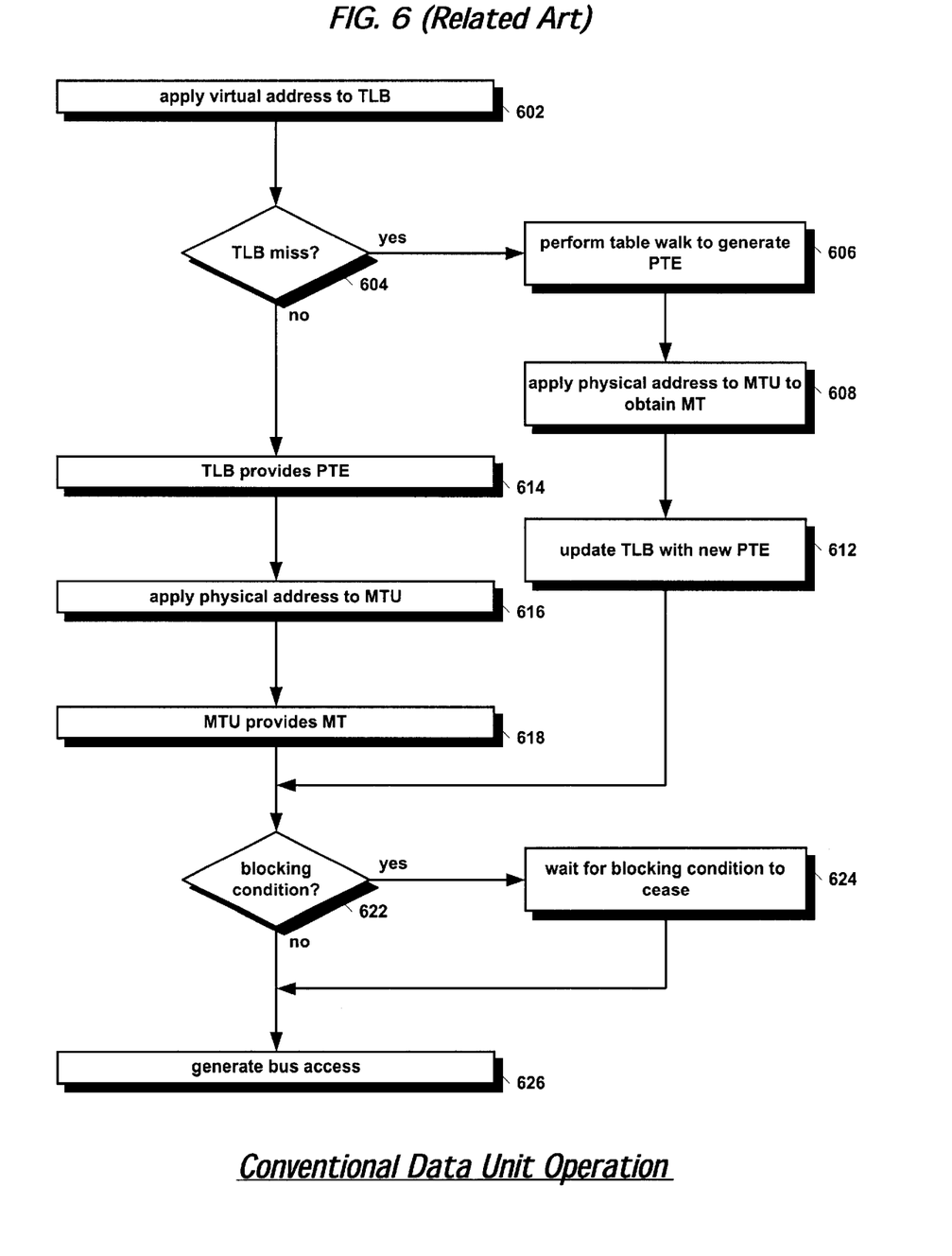
FIG. 6 is a flow chart illustrating operation of the data unit of FIG. 1.

Referring now to FIG. 6, a flow chart illustrating operation of the data unit 100 of FIG. 1 is shown. Flow begins at block 602.

At block 602, virtual address 132 of FIG. 1 is applied to TLB 102 of FIG. 1. The virtual address 132 is associated with an instruction flowing down the microprocessor pipeline, such as a load or store instruction, or is associated with an internal operation, such as a table walk, a speculative prefetch, or write-back to system memory of an evicted cache line. Flow proceeds from block 602 to decision block 604.

At decision block 604, the TLB miss 154 signal is examined to determine whether a TLB miss of the virtual address 132 occurred. If so, flow proceeds to block 606. Otherwise, flow proceeds to block 614.

At block 606, table walk logic 106 of FIG. 1 performs a table walk to obtain and output the PTE 152 of the virtual address 132 since the virtual address 132 missed in the TLB 102. Flow proceeds from block 606 to block 608.

At block 608, mux 104 of FIG. 1 selects the page base address of the PTE 152 output by the table walk logic 106, and the page base address is concatenated with the page offset 158 of FIG. 1 to form physical address 172 of FIG. 1 that is applied to the MTU 108 of FIG. 1. The MTU 108 outputs the MT 144 for the memory range in which the physical address 172 lies. Flow proceeds from block 608 to block 612.

At block 612, the TLB 102 is updated with the PTE 152 output by the table walk logic 106 during block 606. That is, the new PTE 152 generated by the table walk logic 106 is cached in the TLB 102. Flow proceeds from block 612 to decision block 622.

At block 614, the TLB 102 provides the page base address 138 and PCD and PWT bits 134 of the cached PTE associated with the virtual address 132 that hit in the TLB 102. Flow proceeds from block 614 to block 616.

At block 616, mux 104 of FIG. 1 selects the page base address 138 output by the TLB 102, and the page base address is concatenated with the page offset 158 to form physical address 172 which is applied to the MTU 108. Flow proceeds from block 616 to block 618.

At block 618, the MTU 108 outputs the MT 144 for the physical address 172 applied during block 616. Flow proceeds from block 618 to decision block 622.

At decision block 622, the miss logic 112 of FIG. 1 determines whether a blocking condition currently exists which would prevent an access to be generated on the processor bus 148. The miss logic 112 determines whether a blocking condition exists based on the MT 144 provided by the MTU 108, the PCD and PWT bits 134 provided by the TLB 102, and the cache hit signal 162 of FIG. 1. For example, assume a load instruction generated the virtual address 132, and the cache hit signal 162 indicates the virtual address 132 missed in the data cache 116. Consequently, a load must be generated on the processor bus 148 to fetch the load data from memory or an I/O device on the processor bus 148. Assume, the MT 144 has the UC bit 402 of FIG. 4 set, i.e., the region is uncacheable. Assume that a store instruction is pending in the microprocessor. In this situation, a blocking condition exists because the uncacheable memory type dictates that the load must wait for the store to complete before the load access can be generated on the processor bus 148. If a blocking condition exists, flow proceeds to block 624. Otherwise, flow proceeds to block 626.

At block 624, the miss logic 112 waits for the blocking condition to cease. In the example above, the miss logic 112 waits for the store to complete. Flow proceeds from block 624 to block 626.

At block 626, the BIU 114 generates an access on the processor bus 148 using the physical address formed by the page base address 156 and the page offset 158 since no blocking condition exists. Flow ends at block 626.

Figure 7:
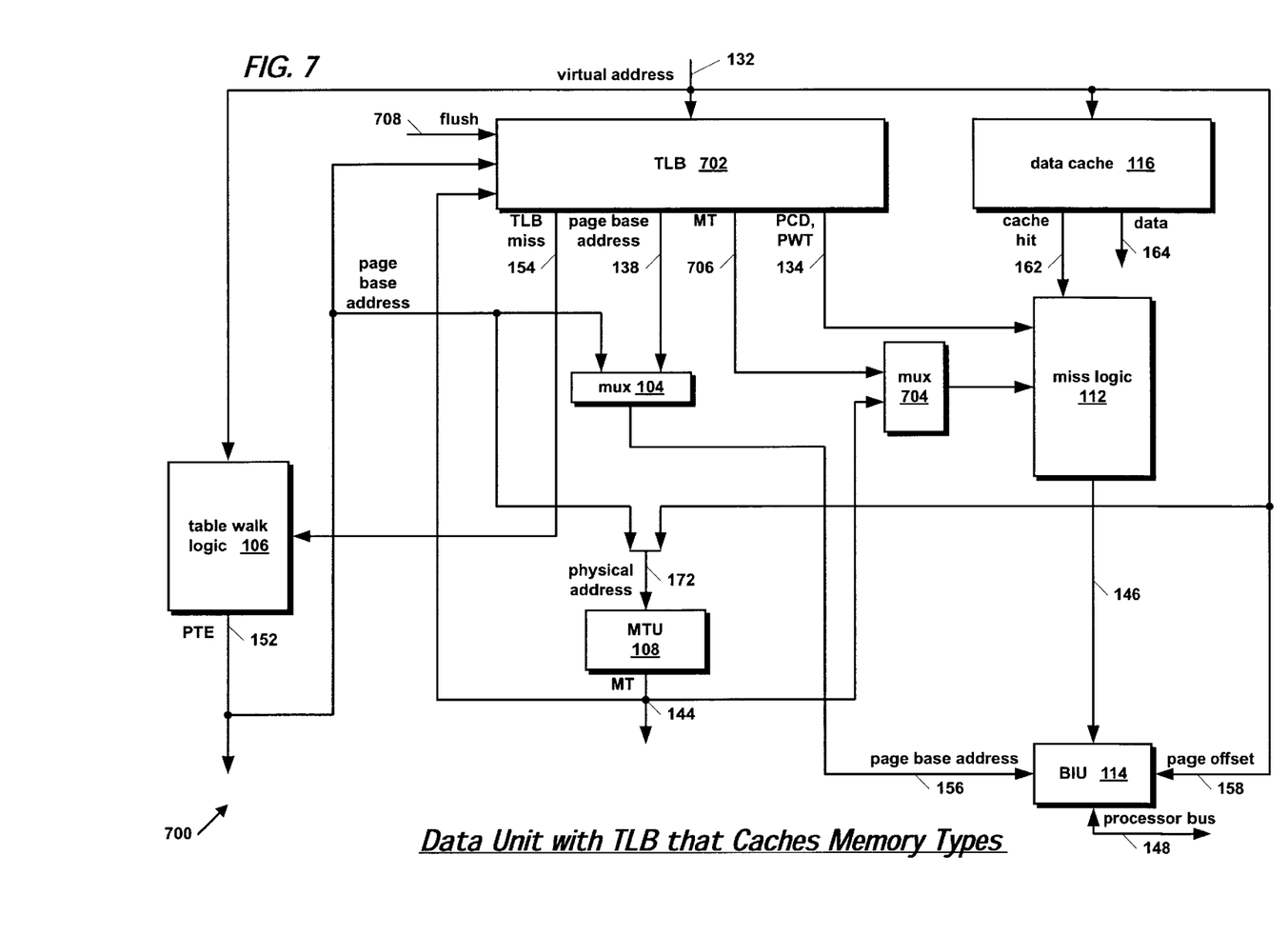
FIG. 7 is a block diagram of a data unit in a microprocessor according to the present invention.

Referring now to FIG. 7, a block diagram of a data unit 700 in a microprocessor according to the present invention is shown. Several elements of the data unit 700 of FIG. 7 are similar to elements of the data unit 100 of FIG. 1, and like elements are numbered the same for simplicity and clarity. However, the data unit 700 of FIG. 7 differs from the data unit 100 of FIG. 1 as follows.

The TLB 702 of FIG. 7 differs from the TLB 102 of FIG. 1 in that the TLB 702 of FIG. 7 caches memory types, such as MT 400 of FIG. 4, previously generated by the MTU 108. That is, the TLB 702 receives the MT 144 from the MTU 108 for caching therein. When the virtual address 132 hits in the TLB 702, the TLB 702 outputs the associated MT on a signal 706 along with the associated page base address 138 and PCD and PWT bits 134.

The data unit 700 also comprises a mux 704 that receives the MT 144 from the MTU 108 and the MT 706 from the TLB 702. If the virtual address 132 hits in the TLB 702, the mux 704 selects the MT 706 from the TLB 702 for provision to the miss logic 112; otherwise, the mux 704 selects the MT 144 from the MTU 108.

In addition, the physical address 172 provided to the MTU 108 is the concatenation of the page offset 158 and the page base address of the PTE 152 provided by the table walk logic 106. That is, the MTU 108 is only accessed to obtain the MT 144 if the virtual address 132 misses in the TLB 702.

Advantageously, in the case of a TLB 702 hit, the miss logic 112 receives the MT 706 from the TLB 702 sooner than the miss logic 112 of FIG. 1 receives the MT 144 from the MTU 108, since the MTU 108 of FIG. 7 does not have to be accessed on a TLB 702 hit. Consequently, according to the present invention the miss logic 112 of FIG. 7 can control the BIU 114 to perform an access on the processor bus 148 sooner than the data unit 100 of FIG. 1, as will be described in more detail below with respect to FIG. 9.

Finally, the TLB 702 receives a flush signal 708 for flushing the TLB 702. In particular, if the MTU 108 is updated, the TLB 702 is flushed using the flush signal 708, as will be described below with respect to FIG. 10.

Figure 8:
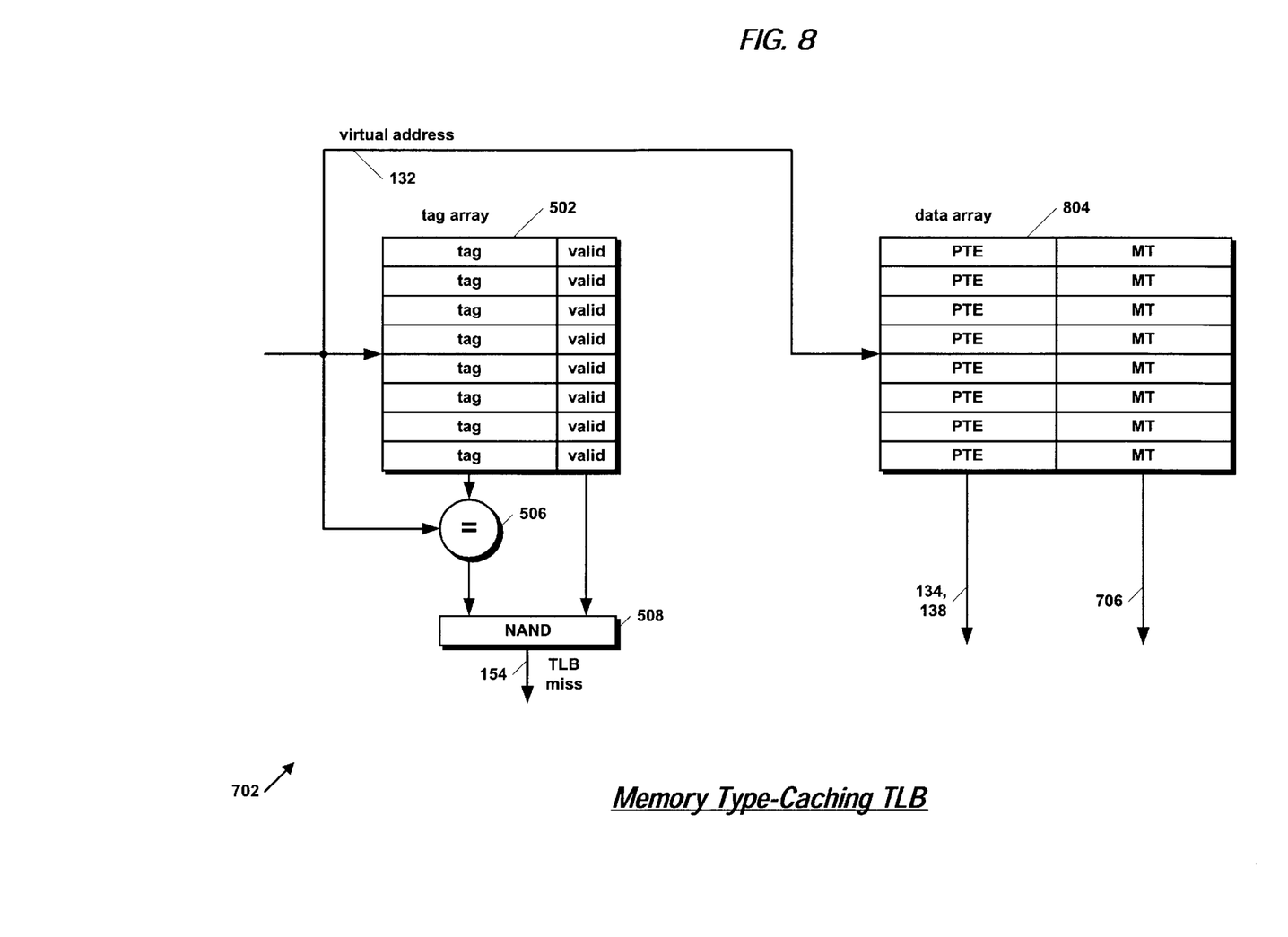
FIG. 8 is a block diagram illustrating the memory type-caching TLB of FIG. 7 according to the present invention.

Referring now to FIG. 8, a block diagram illustrating the memory type-caching TLB 702 of FIG. 7 according to the present invention is shown. Several elements of the TLB 702 of FIG. 8 are similar to elements of the TLB 102 of FIG. 5, and like elements are numbered the same for simplicity and clarity. However, the TLB 702 of FIG. 8 differs from the TLB 102 of FIG. 5 as follows.

The storage elements of the data array 804 of the TLB 702 of FIG. 7 also include a field for storing a memory type (MT) associated with the address range in which the corresponding tag of the tag array 502 lies. The MT of the selected storage element is output by the data array 504 as the MT 706 of FIG. 7. After a miss of a virtual address 132 in the TLB 702, the MT value 144 that is output by the MTU 108 is cached in the MT field of one of the storage elements of the data array 804. Advantageously, the next time the virtual address 132 is accessed, the TLB 702 provides the MT 706, which avoids having to spend the additional time to access the MTU 108 to obtain the MT 144.

Additionally, in the case of a miss of the TLB 702 and subsequent update of the TLB 702, the valid bit of the tag array 502 is not set to indicate the tag is valid until the corresponding MT field of the data array 804 is updated with the MT 144 from the MTU 108.

Figure 9:
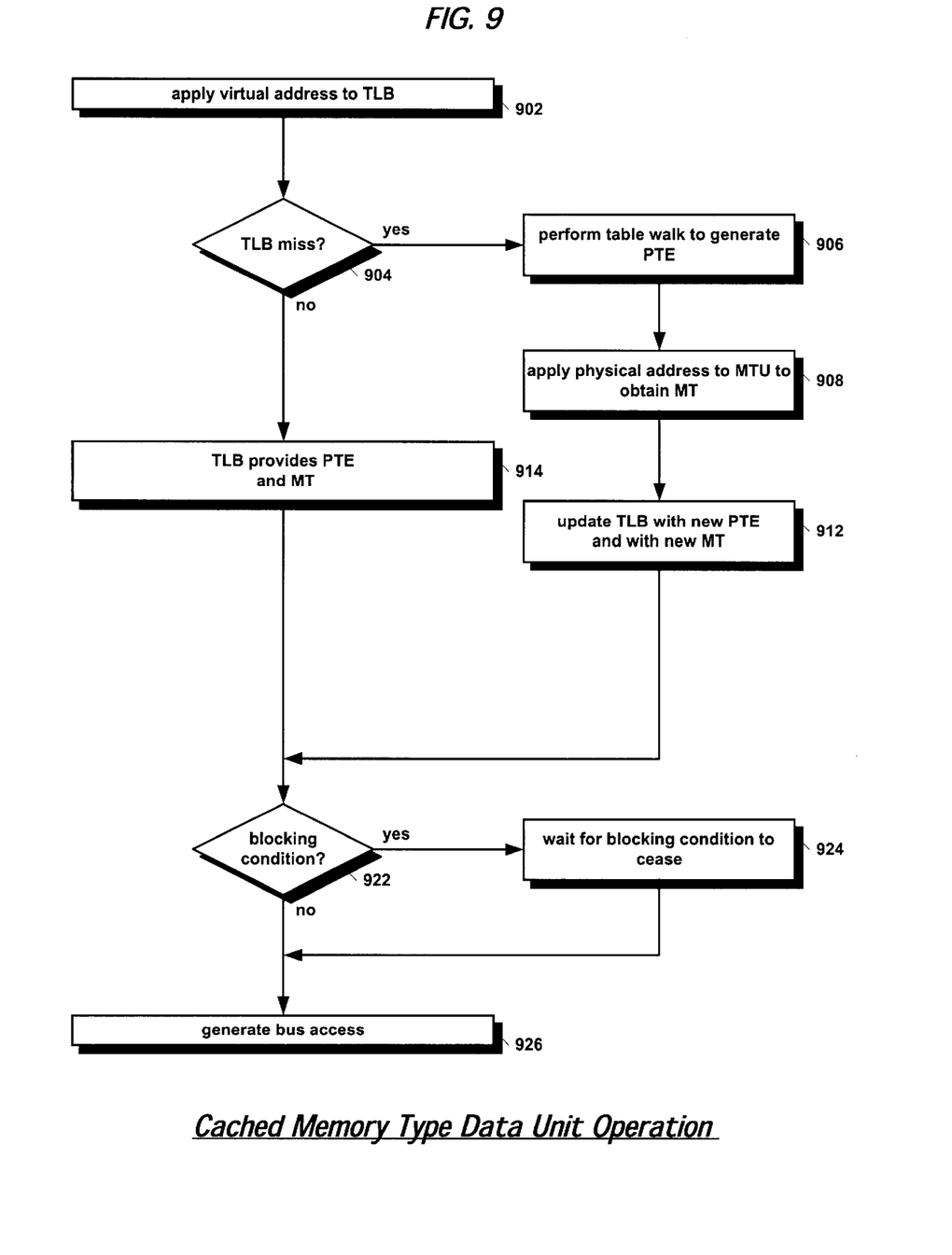
FIG. 9 is a flow chart illustrating operation of the data unit of FIG. 7 according to the present invention.

Referring now to FIG. 9, a flow chart illustrating operation of the data unit 700 of FIG. 7 according to the present invention is shown. Flow begins at block 902.

At block 902, virtual address 132 of FIG. 7 is applied to TLB 702 of FIG. 7. Flow proceeds from block 902 to decision block 904.

At decision block 904, the TLB miss 154 signal is examined to determine whether a TLB miss of the virtual address 132 occurred. If so, flow proceeds to block 906. Otherwise, flow proceeds to block 914.

At block 906, table walk logic 106 of FIG. 7 performs a table walk to obtain and output the PTE 152 of the virtual address 132 since the virtual address 132 missed in the TLB 702. Flow proceeds from block 906 to block 908.

At block 908, the page base address of the PTE 152 output by the table walk logic 106 is concatenated with the page offset 158 of FIG. 7 to form physical address 172 of FIG. 7 that is applied to the MTU 108 of FIG. 7. The MTU 108 outputs the MT 144 for the memory range in which the physical address 172 lies. Flow proceeds from block 908 to block 912.

At block 912, the TLB 702 is updated with the PTE 152 output by the table walk logic 106 during block 906. In addition, the TLB 702 is updated with the MT 144 output by the MTU 108 during block 908. Flow proceeds from block 912 to decision block 922.

At block 914, the TLB 702 provides the page base address 138 and PCD and PWT bits 134 of the cached PTE associated with the virtual address 132 that hit in the TLB 702. In addition, the TLB 702 provides the MT 706 associated with the virtual address 132 that hit in the TLB 702. Advantageously, because the TLB 702 provides the MT 706 in the case of a TLB 702 hit, the need to access the MTU 108 as performed in steps 616 and 618 of FIG. 6 is obviated. Flow proceeds from block 914 to block 922.

At decision block 922, the miss logic 112 of FIG. 7 determines whether a blocking condition currently exists which would prevent an access being generated on the processor bus 148. In the case of a TLB 702 hit, the miss logic 112 determines whether a blocking condition exists based on the MT 706 provided by the TLB 702, the PCD and PWT bits 134 provided by the TLB 702, and the cache hit signal 162 of FIG. 7. Because the miss logic 112 determines whether a blocking condition exists based on the MT 706 output by the TLB 702 rather than the MT 144 output by the MTU 108, in the case of a TLB 702 hit, the miss logic 112 can determine whether a blocking condition exists sooner than would be possible according to block 622 of FIG. 6. If a blocking condition exists, flow proceeds to block 924. Otherwise, flow proceeds to block 926.

At block 924, the miss logic 112 waits for the blocking condition to cease. Flow proceeds from block 924 to block 926.

At block 926, the BIU 114 generates an access on the processor bus 148 using the physical address formed by the page base address 156 and the page offset 158 since no blocking condition exists. Flow ends at block 926.

Figure 10:
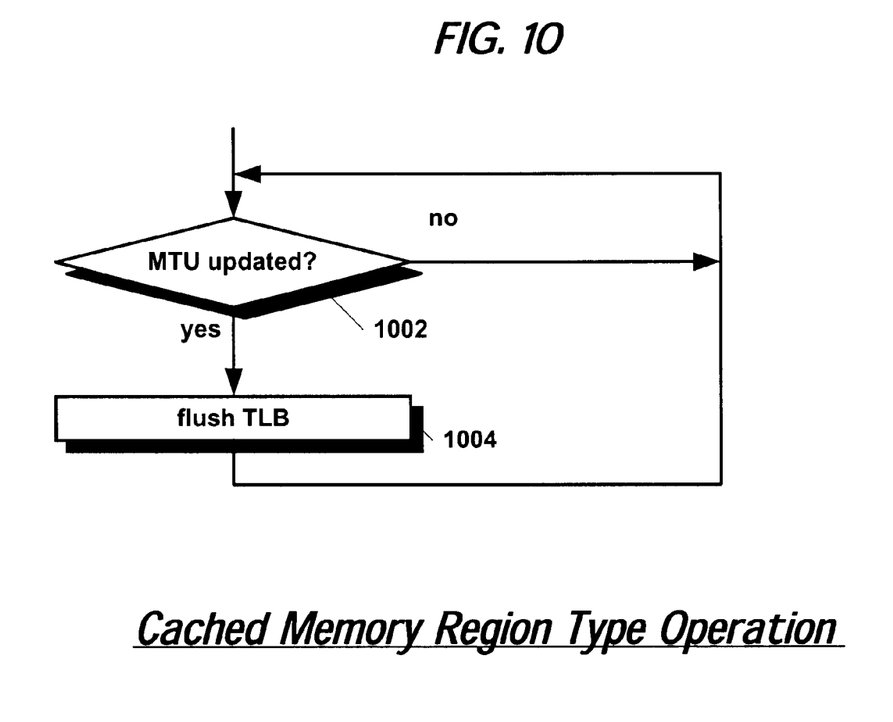
FIG. 10 is a flow chart illustrating further operation of the data unit of FIG. 7 according to the present invention.

Referring now to FIG. 10, a flow chart illustrating further operation of the data unit 700 of FIG. 7 according to the present invention is shown. Flow begins at decision block 1001.

At decision block 1002, a determination is made of whether the MTU 108 of FIG. 1 has been updated. That is, a determination is made as to whether the contents of the MTU 108 have been written to change or add a new address range and memory type. If so, flow proceeds to block 1004. Otherwise, flow returns to block 1002.

At block 1004, the TLB 702 is flushed via the flush signal 708 of FIG. 7. In response to assertion of the flush signal 708, all the valid bits in the tag array 502 of FIG. 8 are cleared. The TLB 702 must be flushed if the MTU 108 is updated so that the MT values in the TLB 702 are not inconsistent with the values in the MTU 108. Otherwise, the TLB 702 would generate incorrect MT values 706, resulting in possible incorrect program operation.

Although the present invention and its objects, features, and advantages have been described in detail, other embodiments are encompassed by the invention. For example, the invention is susceptible to operation with various memory types, and is not limited to the memory types described herein, but is susceptible to operation with various memory types. Furthermore, the invention is not limited to the processor bus described herein. In addition, the invention is not limited to the virtual memory system described herein, but is susceptible to operation with various virtual memory systems.

Those skilled in the art should appreciate that they can readily use the disclosed conception and specific embodiments as a basis for designing or modifying other structures for carrying out the same purposes of the present invention without departing from the spirit and scope of the invention as defined by the appended claims.

We claim:

1. A translation lookaside buffer (TLB) for caching memory types, comprising:
    an input, for receiving a virtual address;
    a tag array, coupled to said input, for caching virtual addresses;
    a data array, coupled to said input, for caching physical addresses translated from corresponding ones of said virtual addresses cached in said tag array, and for caching a memory type associated with each of said physical addresses;
    an output, coupled to said data array, for providing said memory type associated with one of said physical addresses from said data array selected by said virtual address received on said input; and
    a flush input, coupled to said tag array, configured to receive a signal indicating that a memory type unit (MTU) has been updated, said MTU configured to provide said memory type cached in said data array, wherein said virtual addresses cached in said tag array are invalidated in response to said signal indicating said MTU has been updated.

2. The TLB of claim 1, wherein said memory type specifies cache attributes of said associated physical address.

3. The TLB of claim 1, wherein said memory type specifies whether accesses to said associated physical address are uncacheable.

4. The TLB of claim 1, wherein said memory type specifies whether accesses to said associated physical address have writeback cache attributes.

5. The TLB of claim 1, wherein said memory type specifies whether accesses to said associated physical address have write-through cache attributes.

6. The TLB of claim 1, wherein said memory type specifies whether accesses to said associated physical address have write-protected cache attributes.

7. The TLB of claim 1, wherein said memory type specifies whether an access to said associated physical address may be write-combined.

8. The TLB of claim 1, wherein said memory type comprises a Pentium Pro processor memory type.

9. The TLB of claim 1, wherein said memory type specifies instruction execution attributes of instructions necessitating accesses to said associated physical address.

10. The TLB of claim 1, wherein said memory type specifies whether accesses to said associated physical address are strongly or weakly ordered.

11. The TLB of claim 1, wherein said memory type specifies whether or not accesses to said associated physical address may be executed out-of-order.

12. The TLB of claim 1, wherein said memory type specifies whether or not speculative accesses to said associated physical address are allowed.

13. The TLB of claim 1, wherein said data array caches page table entries.

14. The TLB of claim 13, wherein said physical addresses are comprised in said page table entries.

15. The TLB of claim 14, wherein said physical addresses comprise page base addresses.

16. A data unit in a microprocessor having a processor bus, the data unit comprising:
    a memory type unit (MTU), for storing physical memory ranges and memory types associated with said physical memory ranges; and
    a translation lookaside buffer (TLB), coupled to said MTU, for caching page table entries, and for caching memory types from said MTU associated with physical addresses in said page table entries, wherein said TLB is flushed in response to said MTU being updated.

17. The data unit of claim 16, wherein said TLB comprises:
    an input, for receiving a virtual address; and
    an output, for indicating whether said virtual address hits in said TLB.

18. The data unit of claim 17, further comprising:
    table walk logic, coupled to said TLB, for generating a page table entry for said virtual address if said virtual address misses in said TLB.

19. The data unit of claim 18, wherein said pare table entry comprises a physical address associated with said virtual address.

20. The data unit of claim 19, wherein if said virtual address misses in said TLB, said TLB is updated with said page table entry and with one of said memory types stored in said MTU.

21. The data unit of claim 20, wherein said one of said memory types stored in said MTU is associated with one of said physical memory ranges in which said physical address lies.

22. The data unit of claim 17, further comprising:

miss logic, coupled to said TLB, for determining whether an access on the processor bus necessitated by said virtual address is blocked based on one of said memory types selected from said TLB by said virtual address.

23. A microprocessor, comprising:

a bus interface unit (BIU), coupled to a bus external to the microprocessor, for issuing requests on said bus;

a memory type unit (MTU), coupled to said BIU, for storing memory types associated with address ranges of said bus, said memory types specifying caching characteristics of said requests on said bus in each of said address ranges;

a translation lookaside buffer (TLB), coupled to said BIU, for caching virtual memory addresses, and for caching corresponding addresses of said bus translated from said virtual memory addresses, and for caching one of said memory types stored in said MTU for each of said addresses of said bus; and a flush input, coupled to said TLB, for indicating said MTU has been updated, wherein said TLB is flushed in response to said MTU being updated.

24. The microprocessor of claim 23, wherein if a virtual address hits in said TLB, said TLB provides said one of said memory types associated with said virtual address, thereby obviating a need to access said MTU to obtain said one of said memory types.

25. The microprocessor of claim 23, wherein said one of said memory types cached in said TLB is associated with one of said address ranges of said bus in which said associated one of said addresses of said bus lies.

26. A method of providing a memory type for a physical address range in a microprocessor, the method comprising:

detecting a miss of a virtual address in a translation lookaside buffer (TLB);

translating said virtual address into a physical address in response to said miss;

providing a memory type of said physical address in response to said physical address;

caching said memory type in said TLB in association with said virtual address;

detecting an update to a memory type unit configured to provide said memory type; and flushing said TLB in response to said detecting said update to said memory type unit.

27. The method of claim 26, further comprising:

caching said physical address in said TLB in association with said virtual address.

28. The method of claim 26, further comprising:

providing said memory type from said TLB in response to said virtual address after said caching said memory type in said TLB.

29. The method of claim 27, further comprising:

determining whether an access to said physical address on a bus of the microprocessor is blocked based on said memory type provided by said TLB.

30. The method of claim 26, wherein said translating comprises performing a page table walk based on said virtual address.

31. The method of claim 26, wherein said physical address comprises a page base address.

32. The method of claim 26, wherein said providing a memory type of said physical address in response to said physical address is performed by a memory type unit.

33. A method of providing a memory type for a physical address range in a microprocessor, the method comprising:

caching a plurality of physical addresses translated from a plurality of virtual address in a translation lookaside buffer (TLB);

caching in said TLB a plurality of memory types associated with said plurality of physical addresses;

applying a virtual address to the TLB;

providing one of said plurality of memory types cached in said TLB associated with one of said plurality of physical addresses based on said virtual address applied to said TLB; and flushing said TLB in response to detection of an update to a memory type unit in the microprocessor, said memory type unit providing said plurality of memory types associated with said plurality if physical addresses for caching in said TLB.

34. The method of claim 33, further comprising:

determining whether a condition exists necessitating blocking of a bus request on a bus coupled to the processor, said bus request necessitated by said virtual address.

35. The method of claim 34, wherein said determining is performed based on said providing said one of said plurality of memory types cached in said TLB.

* * * * *